No. 611,946. Patented Oct. 4, 1898.
D. SHANNON.
GRINDSTONE.
(Application filed Feb. 9, 1898.)
(No Model.)

Witnesses:
F. L. Ourand.
Jo. L. Coombs

Inventor:
Douglass Shannon
Louis Bagger & Co.
Attorneys

UNITED STATES PATENT OFFICE.

DOUGLASS SHANNON, OF FAIR GROVE, MICHIGAN.

GRINDSTONE.

SPECIFICATION forming part of Letters Patent No. 611,946, dated October 4, 1898.

Application filed February 9, 1898. Serial No. 669,669. (No model.)

*To all whom it may concern:*

Be it known that I, DOUGLASS SHANNON, a citizen of the United States, and a resident of Fair Grove, in the county of Tuscola and State of Michigan, have invented certain new and useful Improvements in Grindstones; and I do hereby declare that the following is a full, clear, and exact description of the invention, which will enable others skilled in the art to which it appertains to make and use the same, reference being had to the accompanying drawings, which form a part of this specification.

My invention relates to means for centering or truing grindstones and also to bearings for the shaft of the same, whereby I secure important advantages with respect to efficiency in use.

The invention consists in the novel construction and combination of parts hereinafter fully described and claimed.

Figure 1:
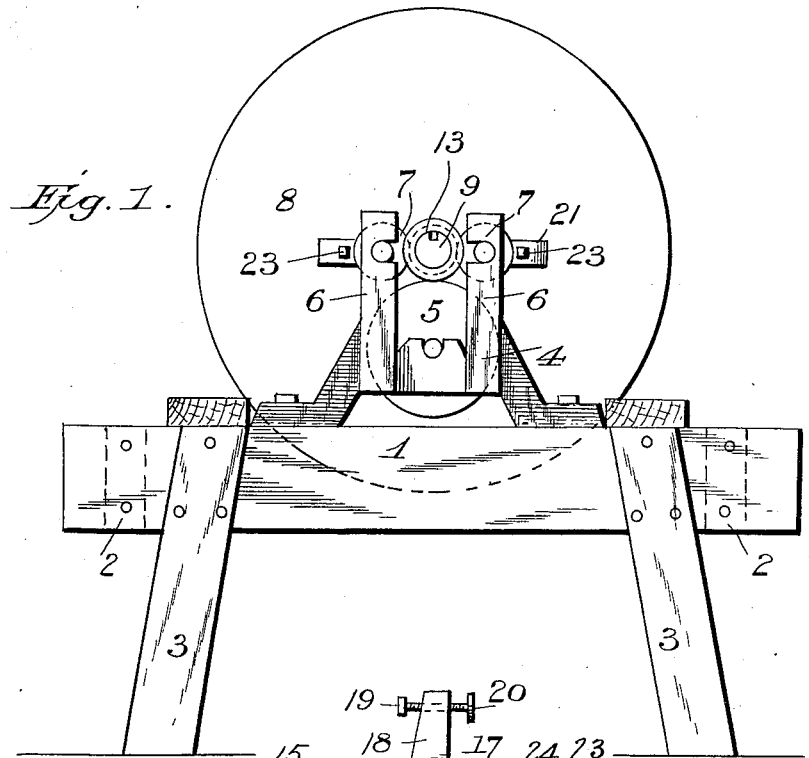
Figures 2, 3:
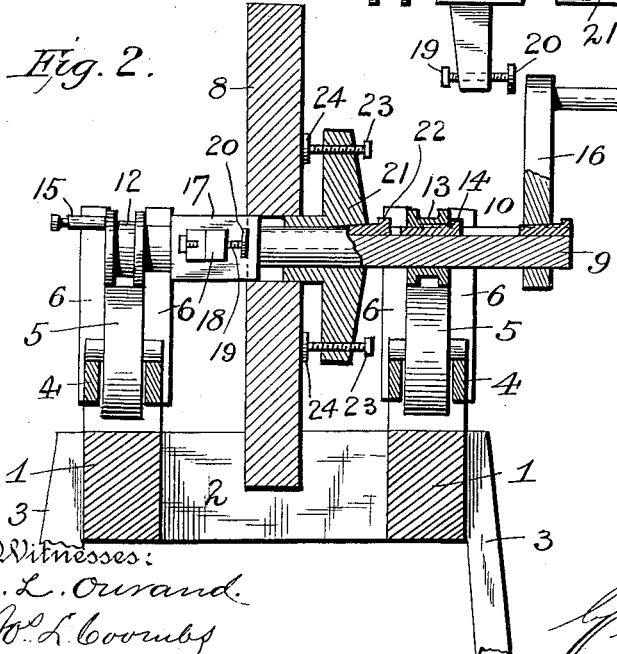

In the accompanying drawings, Figure 1 is a side elevation of a grindstone, showing my improved means for truing the same and also the roller-bearings for the shaft thereof. Fig. 2 is a central transverse section of the same. Fig. 3 is an elevation of the shaft detached.

In the said drawings the reference-numeral 1 designates the frame or support for the grindstone, comprising the side beams, connected together by end beams 2 and provided with legs 3.

Secured to the upper sides of the side beams are brackets 4, in which are journaled large roller or wheel bearings 5. These brackets at opposite sides of the journals of said bearings are provided with parallel uprights 6, arranged in pairs and formed with semicircular slots in their inner sides, in which are journaled the small wheel or roller bearings 7, which work against the shaft of the grindstone. The said brackets and the uprights 6 are cast solid or integral with each other.

The numeral 8 designates the grindstone, provided with a central aperture for the passage of the shaft 9, which is formed with a longitudinal groove 10. This shaft is cylindrical and at one end is provided with a fixed flanged wheel 12 and near the other end with a removable flanged wheel 13. This latter wheel is provided with a key 14, engaging with the groove 10, so as to hold the wheel in place. The fixed wheel is provided with a wrist-pin 15, which may be connected with a treadle (not shown) for turning the stone by foot-power. At the other end the shaft is provided with a removable handle 16. The said shaft near one end is formed with an enlargement 17, formed with an arm 18, provided at each end with a set-screw 19, provided with a washer 20, which is pressed tightly against the stone by the said screws. These washers may be dispensed with, however, if desired. At the opposite side of the stone is a laterally-removable arm 21, provided with a key 22 for preventing rotation of the arm and holding it in place. This arm is at a right angle to the arm 18 and is provided with set-screws 23 and also with washers 24, if desired. The object of making said arm 21 movable is to accommodate it to grindstones of varying thickness.

In practice the flanged wheels of the shaft rest upon the large roller-bearings, with the small rollers or wheels bearing against said wheels. By this means the friction is reduced to a minimum. To true the stone, the set-screws of the arms are loosened and the shaft and stone rotated a few times, causing the stone to be centered. The screws are then tightened, securely holding the stone in place.

Having thus fully described my invention, what I claim is—

The combination with the frame, the brackets, and the large and small bearings, of the shaft having a longitudinal groove, the arm connected with said shaft, the set-screws at the ends, the arm at a right angle to said arm, the set-screws, the stationary and movable flanged wheels and the keys for keeping said arm and movable wheel in place, substantially as described.

In testimony that I claim the foregoing as my own I have hereunto affixed my signature in presence of two witnesses.

DOUGLASS SHANNON.

Witnesses:
H. D. HINKLEY,
M. L. HINKLEY.